US007849460B1

(12) United States Patent
Martin et al.

(10) Patent No.: US 7,849,460 B1
(45) Date of Patent: Dec. 7, 2010

(54) SYSTEM AND METHODS FOR GENERIC INSTALLATION PREREQUISITE VERIFICATION (75) Inventors: Sylvia J. Martin, Shrewsbury, MA (US); Mordechai Zvi Zur, Newton, MA (US); Anoop George Ninan, Milford, MA (US)

(73) Assignee: EMC Corporation, Hopkinton, MA (US)

( * ) Notice: Subject to any disclaimer, the term of this patent is extended or adjusted under 35 U.S.C. 154(b) by 1568 days.

(21) Appl. No.: 11/158,866

(22) Filed: Jun. 22, 2005

(51) Int. Cl.
*G06F 9/44* (2006.01)
*G06F 9/445* (2006.01)
*G06F 15/16* (2006.01)

(52) U.S. Cl. ...................... 717/174; 717/168
(58) Field of Classification Search ............... None
See application file for complete search history.

(56) References Cited

U.S. PATENT DOCUMENTS

| | | | |
|---|---|---|---|
| 6,560,776 B1* | 5/2003 | Breggin et al. ............... 717/176 |
| 7,233,957 B1* | 6/2007 | Sheehy et al. ....................... 1/1 |
| 7,397,770 B2* | 7/2008 | Le et al. ....................... 370/254 |
| 7,469,290 B1* | 12/2008 | Liubovich et al. ............ 709/225 |
| 7,587,713 B1* | 9/2009 | Barrett et al. ................ 717/168 |
| 7,587,715 B1* | 9/2009 | Barrett et al. ................ 717/176 |
| 2006/0037016 A1* | 2/2006 | Saha et al. ................... 717/178 |
| 2006/0224544 A1* | 10/2006 | Keith, Jr. ....................... 706/60 |
| 2007/0169109 A1* | 7/2007 | Neswal ........................ 717/174 |

* cited by examiner

*Primary Examiner*—Michael J Yigdall
*Assistant Examiner*—Ben C Wang
(74) *Attorney, Agent, or Firm*—Chapin IP Law, LLC (57) ABSTRACT

A framework for defining and performing installation prerequisite checking using a generic template includes identifying a candidate agent and a corresponding prerequisite check from among a plurality of predetermined prerequisite checks. The prerequisite checks are indicative of installability of the candidate agent on a host computer. An install engine generates a prerequisite script bundle based on a set of configuration parameters corresponding to the candidate agent and the identified prerequisite check. The configuration parameters are defined in a template format adapted to define a plurality of configuration parameter sets, enabling a single generic prerequisite check format to define the configuration parameters. The install engine invokes the script bundle inclusive of the script on the host computer for computing the installation status, (i.e. prerequisite check results) of the candidate agent based on the results.

24 Claims, 8 Drawing Sheets

SYSTEM AND METHODS FOR GENERIC INSTALLATION PREREQUISITE VERIFICATION

BACKGROUND

A storage area network (SAN) typically interconnects many mass storage devices, commonly known as storage arrays, with a set of users for providing data storage and retrieval services to the user community. The storage area network interconnects a plurality of nodes including host computers, storage arrays, connectivity devices, and databases for providing the information retrieval services to the users. The host computers execute software entities known as agents for monitoring and managing the various nodes in the storage area network. In a large storage area network, the number of nodes may be substantial. Accordingly, users typically find it beneficial to operate a management application for monitoring and controlling the various nodes in the storage area network.

Conventional management applications deploy agents on host computers (hosts) in the storage area network for effecting management and control operations. A variety of different types of agents are available for deployment, and each type generally monitors and manages a particular type of node, or manageable entity in the storage area network. Further, a management application typically provides agents for each of a plurality of operating systems that may be available on the particular host computers on which the agents are deployed. As an example, for a particular vendor storage system, there might be different versions (i.e., executables) of the same agent that execute on Unix hosts (e.g., Solaris and Linux) and Windows hosts. Solaris is a trademark of Sun Microsystems, Inc. of Santa Clara, Calif., USA, and Windows is a trademark of Microsoft Corporation of Redmond, Wash., USA. Conventional agent deployment is therefore complex and includes copying and installing each of the agents on the corresponding host. Accordingly, in a large storage area network, an administrator of a conventional storage area network management application installs many agents on multiple host nodes throughout the storage area network to manage a wide variety of manageable entities. The deployed agents monitor, control and manage various storage area network devices for providing command and control capability from a user console via a server coupled to the console.

SUMMARY

There are deficiencies associated with conventional mechanisms and techniques for managing agent installation and operation in a network environment such as a storage area network. In a large storage area network, many agents are deployed on various host computers (hosts or servers) throughout the network. The agents correspond to a plurality of manageable entities in the storage area network, such as storage arrays, connectivity devices, and databases. Further, the agents correspond to a plurality of operating systems (OSs) from various vendors, such as Windows 2000, Windows XP, IBM MVS, AIX and HP/UX, to name several. Accordingly, each host in the storage area network is operable to execute a plurality of various types of agents specific to the manageable entities and operating systems available. Manual installation of all of these agents is a large and cumbersome task using conventional installation mechanisms and techniques.

In the storage area network, the agents monitor and manage entities such as storage arrays, connectivity devices, and databases (all collectively known as manageable entities or resources). Accordingly, a typical storage area network configuration deploys multiple agents on one or more host computers depending on the number and arrangement of the manageable entities in the storage area network (storage area network).

Configurations of the invention are based, in part, on the observation that deployment of agents in a large storage area network having many hosts each managing multiple manageable entities is a formidable effort. Each agent requires an accompanying set of support files such as startup files, unzip procedures, and file placement operations. Some agents further require third party software to be present on a host in order for that agent to be properly installed and executed. Further, there are a number of agent types, each applicable to one of several operating systems available on a host computer. Accordingly, deploying, or installing, agents involves determining which agent and related files are needed on a particular host, copying the proper set of objects (files) to that agent, and ensuring that the proper runtime resources are available for the agent to execute. One particular approach to managing large installs is a bulk installation operation, disclosed in copending U.S. patent application Ser. No. 11/094,494, filed Mar. 30, 2005, entitled "SYSTEM AND METHODS FOR SAN AGENT INSTALLATION", incorporated herein by reference.

Certain agents have particular constraints, or conditions, which are either desirable or mandatory for successful installation and operation. Accordingly, installation of agents initiates one or more so-called prerequisite checks. A prerequisite check is a verification of existing resources needed or desirable for executing a particular agent. Without such constraints satisfied, operation of the agent may be diminished or unavailable. Such constraints are identified as prerequisites for each agent. Particular mechanisms for addressing and processing prerequisites are discussed in the copending U.S. patent application cited above. Further, configurations discussed herein are based on the observation that the installation procedure tends to perform a prerequisite check of a similar nature for many agents and for checking various prerequisites. Often, such prerequisite checks may differ only by a small number of variables or parameters. Unfortunately, conventional installation mechanisms suffer from the shortcoming that prerequisite checking often involves separate prerequisite checks, or scripts, for each agent type and for each operating system (OS) under which the agent runs. Accordingly, many prerequisite scripts are manipulated in installing a large agent base, thereby imposing code management and maintenance for many lines of code in the script files. Further, it may be difficult to aggregate the cumulative effect of multiple agents, such as the collective consumption of disk space, for example. Such a cumulative effect may occur when sufficient disk or memory space is available for one agent, but multiple installed agents combine to exceed the available space.

Accordingly, configurations discussed herein substantially overcome the above-described shortcoming by employing a generic framework applicable to a variety of prerequisite checks, and apply configuration parameters to one or more predetermined checks called for by the agent. The generic framework employs a configuration file having agent specific install information including references to one or more prerequisite checks, each identified by a prerequisite check label, and a script information file including prerequisite check specific information (checks) for each referenced prerequisite check. A bundler builds a prerequisite script bundle (script bundle, hereinafter) from the generic script framework by substituting configuration parameters from the install information (i.e. configuration files) and check parameters from the script information identified by the by the check label. Each agent identifies prerequisite checks by the check label, and provides configuration parameters corresponding to variables, or parameters, for each requested check to define a script bundle. The generated script bundle is invoked on the target installation host for performing each prerequisite check, and returns results indicative of the success or failure of the agents, i.e. the installability of one or more agents on the host.

Therefore, agents are deployable with only a configuration file that specifies particular configuration parameters in a template format, rather than a conventional prerequisite script. The prerequisite checks identified by the configuration parameters are stored in a common script information file. Each prerequisite check listed in the script information file, in turn, references (points to) a specific prerequisite script including the business logic (instructions) for performing the actual check. Development of a new agent installation involves specifying the configuration parameters to reference the existing prerequisite check in the script information. Development of a new prerequisite check involves adding the prerequisite check and check parameters to the common script information, and referencing newly added prerequisite scripts from the newly created script information entry, thereby relieving the developer from manually coding an installation procedure (e.g. agent and OS specific script) for each agent.

Accordingly, installation of a particular agent includes analyzing, or checking, the prerequisites identified in the configuration file for that agent to ensure an operational environment. Such prerequisites may include, for example, sufficient disk space, other agents, and support services such as database access processes. Prerequisites may therefore be thought of as dependencies of one entity upon another, such as processes (i.e. other agents), files, or other resources (i.e. disk space or transmission speed). These dependencies are expressible in a variety of ways, such as rules, trees, nested lists, etc. For example, a prerequisite check might be expressed as "IF server A requested THEN check store process B present," or as a set of tree nodes "Process B," "File C", and "Transmission Line D" as children of the "Server A" node. Other representations will be apparent to those of skill in the art.

In further detail, the method of installing an agent on a host computer as disclosed herein includes identifying a candidate agent and a corresponding prerequisite check from among a plurality of predetermined prerequisite checks, in which the prerequisite check is indicative of installability of the candidate agent on the host computer. An install engine generates a script bundle based on a set of configuration parameters corresponding to the candidate agent and the identified prerequisite check or checks referenced from the configuration parameters. The configuration parameters are defined in a template format adapted to define a plurality of configuration parameter sets, enabling the creation of a script bundle with the configuration parameters. The install engine sends the generated script bundle to the host computer for computing the installation status, (i.e. prerequisite check results) of the candidate agent based on the results of executing the prerequisite script and predetermined prerequisite criteria.

The script bundle includes the identified prerequisite check scripts referenced from the configuration parameters, input parameters from the script information for each of the referenced checks, and an invocation command for executing (running) the prerequisite scripts on the host computer. The script bundle is transmitted as a message indicative of all prerequisite checks for a particular agent, such that aggregate results for the collective set of checks may be computed. For example, failure of a particular prerequisite may merely constitute a warning, while another may indicate an inability to start the agent. It follows that fatal results for any of the prerequisite checks results in prerequisite failure for the candidate agent in question.

Identification of the candidate agent further includes retrieving the configuration parameters corresponding to the candidate agent, in which the configuration parameters are stored in a media repository operable for storing the plurality of predetermined prerequisite checks. The install engine identifies, from a check label in the configuration parameters, the prerequisite checks corresponding to (i.e. required for) the candidate agent for installation on the host computer. The check label is indicative of each prerequisite check to be performed, in which each of the check labels is indicative of a particular check in a script information file. Accordingly, the script information file is operable to store a plurality of checks each corresponding to one or more agents, and is further operable to enable the bundler to generate a corresponding prerequisite check script bundle based on each of the check labels. Therefore, the script information file (script information) includes a plurality of prerequisite checks, in which each of the prerequisite checks includes a label indicative of the prerequisite in question and at least one check parameter.

In particular configurations, generating the script bundle further includes retrieving, from the identified prerequisite check, check parameters operative to perform the prerequisite check using the identified check parameters. The bundler employs the generic framework to build, from the configuration parameters in the configuration file and the retrieved check parameters, a script bundle corresponding to the prerequisite checks required for the agents. Therefore, generating the script bundle includes retrieving, based on the configuration parameters, the prerequisite scripts having check instructions (i.e. business logic for performing the prerequisite check), in which the check instructions are responsive to the check parameters.

In the exemplary configuration, the check parameters include inputs and expected outputs, and the install engine generates the script bundle to employ the check parameters as inputs to the prerequisite scripts. The corresponding analysis of the results includes comparing the results of the executed script to the predetermined outputs, and determining a result based on the comparison.

Invocation of the generated script bundle further includes collecting results from each of the prerequisite checks indicative of the outcome of executing the prerequisite script on the host computer, and analyzing, based on cumulative results of each of the prerequisite checks, an operational status indicative of whether the candidate agent may be installed on the host. Invoking further comprises transmitting the script bundle to the host, wherein each of the hosts is operative to execute the script bundle via a master agent and return a corresponding result. In particular arrangements, invoking further comprise authenticating the script bundle at the host to confirm identity of the purported host.

In a large managed information environment, such as a storage area network having many hosts, the install engine iterates, for each of the hosts, through each of the prerequisite checks for each agent to be installed, and builds the script bundle inclusive of each of the checks for the candidate agents. The install engine evaluates the results collectively to determine the status of each of the candidate agents on the host.

In the exemplary configuration, the script information includes check parameters corresponding to the generic prerequisite check template employed by the prerequisite checks, in which the checks are employed for a particular agent further comprising a subset of the checks in the script information. The check parameters selectively include attributes corresponding to different OSs, and for each agent type. Further, the prerequisite check lookup in the script information is performed based on configuration parameters (i.e. the label), such that the scripts are not dependent on a particular agent and OS, thus maintaining the generic nature of the script bundles.

In further detail, the method of installing agents in a managed information environment includes receiving a request to install a set of agents on a host computer, in which the agent is operable for monitoring managed objects in the managed information environment, and identifying a set of prerequisite entities corresponding to each of the requested agents. The management application performing the install receives a check result indicative of the status of the identified set of prerequisite entities on the host for installation, and determines, based on the check result, whether the set of prerequisite entities is operable to support each of the requested agents on the respective host. The management application then enumerates, if the check result is indicative of insufficient prerequisite entities, characteristics of the insufficient prerequisite entities on a Graphical User Interface (GUI) screen.

Alternate configurations of the invention include a multi-programming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a JAVA® Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., Compact Disc-Read Only Memory, or CD-ROM), floppy or hard disk or other medium such as firmware or microcode in one or more Read-Only (ROM) or Random Access Memory (RAM) or Programmable ROM (PROM) chips, field programmable gate arrays (FPGAs) or as an Application Specific Integrated Circuit (ASIC). The software or firmware or other such configurations can be installed onto the computerized device (e.g., during operating system for execution environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Configurations discussed herein provide a framework for applying a prerequisite script bundle, applicable to a variety of prerequisite check scripts, and applying agent specific configuration parameters to one or more predetermined checks called for by the agent. The generic framework employs a configuration file having agent specific install information including a prerequisite check label and the corresponding configuration parameters, and a script information file including prerequisite check specific information indexed by the check label, to build a script bundle by integrating configuration parameters from the install information and check parameters from the script information identified by the by the check label. Each agent identifies prerequisite checks by the check label, and provides configuration parameters corresponding to variables, or parameters, employed by the check. Each such prerequisite check is defined in the script information file as check parameters, such as type-value pairs, operable to define a script bundle from the generic template. The generated script bundle, operable for performing one or more prerequisite checks for the agent, is invoked on the target installation host for performing each prerequisite check, and returns results indicative of the success or failure of the agent, i.e. the installability of the agent on the host.

Therefore, agents are deployable with only a configuration file to specify particular configuration parameters in a template format. The predetermined prerequisite checks identified by the configuration parameters are stored in a common script information file, available to each agent. Development of a new agent prerequisite check involves specifying the configuration parameters in a configuration file to reference the existing prerequisite checks in the script information. Development of a new prerequisite check involves adding the prerequisite check and check parameters to the common script information, thereby relieving the developer from manually coding an installation procedure for each agent. In this manner, agent deployment involves merely defining the configuration file for the agent, and referencing the appropriate predetermined prerequisite checks, rather than defining a separate prerequisite script for each agent and OS under which it executes.

Figure 1:
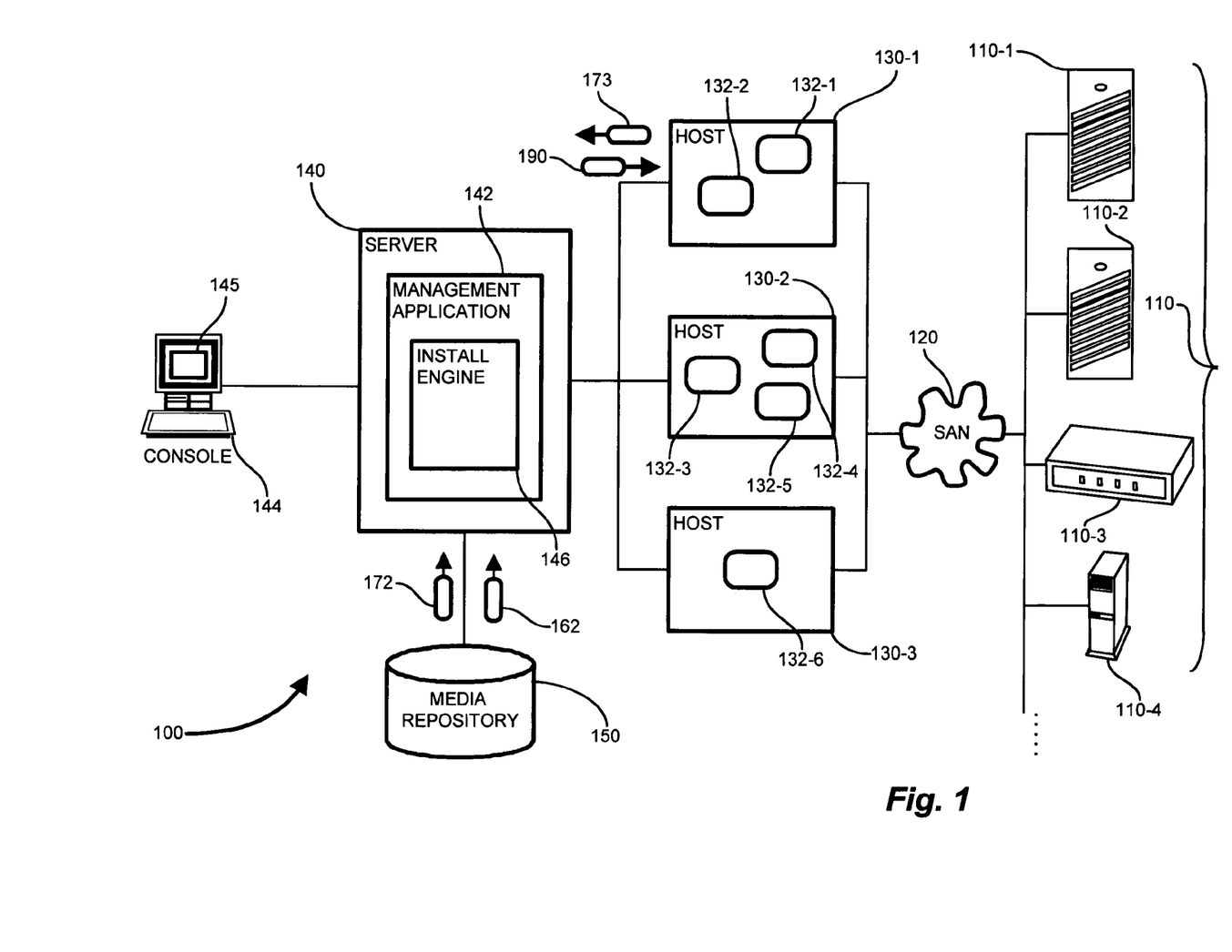
FIG. 1 is a context diagram of an exemplary managed information environment suitable for use with the present invention.

FIG. 1 is a context diagram of an exemplary managed information environment suitable for use with the present invention. Referring to FIG. 1, a managed information environment 100 includes a plurality of manageable entities 110-1 . . . 110-N (110 generally), such as storage arrays 110-1, 110-2, connectivity devices 110-3, and database servers 110-4 interconnected to a plurality of hosts 130-1 . . . 130-3

(130 generally) by a storage area network 120. The hosts 130 execute one or more agents 132-1.132-6 (132 generally) for monitoring and managing the manageable entities 110. The hosts 130 connect to a server 140 having a management application 142 responsive to a console 144. The management application 142 further includes an install engine 146 for generating the script bundles 190 and invoking the scripts 172 on the respective hosts 130, discussed further below. Each of the agents 132 is further responsive to the management application 142 for managing the manageable entities 110. The server 140 also connects to a media repository 150 for storing the agents 132 in an executable form, along with related support files for installing the agents 132 throughout the storage area network 120, such as configuration parameters and check parameters, discussed further below. Note that the storage area network 120, shown in an exemplary manner between the hosts 132 and manageable entities 110, serves to interconnect the server 140, hosts 130 and manageable entities 110. Hosts 132 may or may not be disposed proximate to the manageable entities 110 which they manage, and the server 140 may employ a storage area network connection to the various hosts 130. It will be apparent to those of skill in the art that a variety of networking options are available among the storage area network nodes, such as optical (fiber channel), Small Computer Systems Interface (SCSI), T1, E1 and other mediums.

In operation, the management application 142 controls starting and stopping of the various agents 132, as well as transferring executable files corresponding to the agents in the storage area network interface 120, or interconnection. The agents 132, in turn, communicate with one or more manageable entities 110 in the storage area network 120 for monitoring and managing the manageable entities 110 and reporting and receiving status and instructions, respectively, with the management application 142. The agents 132 are each of a particular type, operable to manage a particular type of manageable entity 110. Further, the agents 132 are specific to a particular operating system of the host computer on which they run (execute), such as AIX, Windows 2000 (W2000), Windows XP (WXP), MVS, HP-UX, SUN/Solaris, Linux, etc. as are known in the industry.

Figure 2:
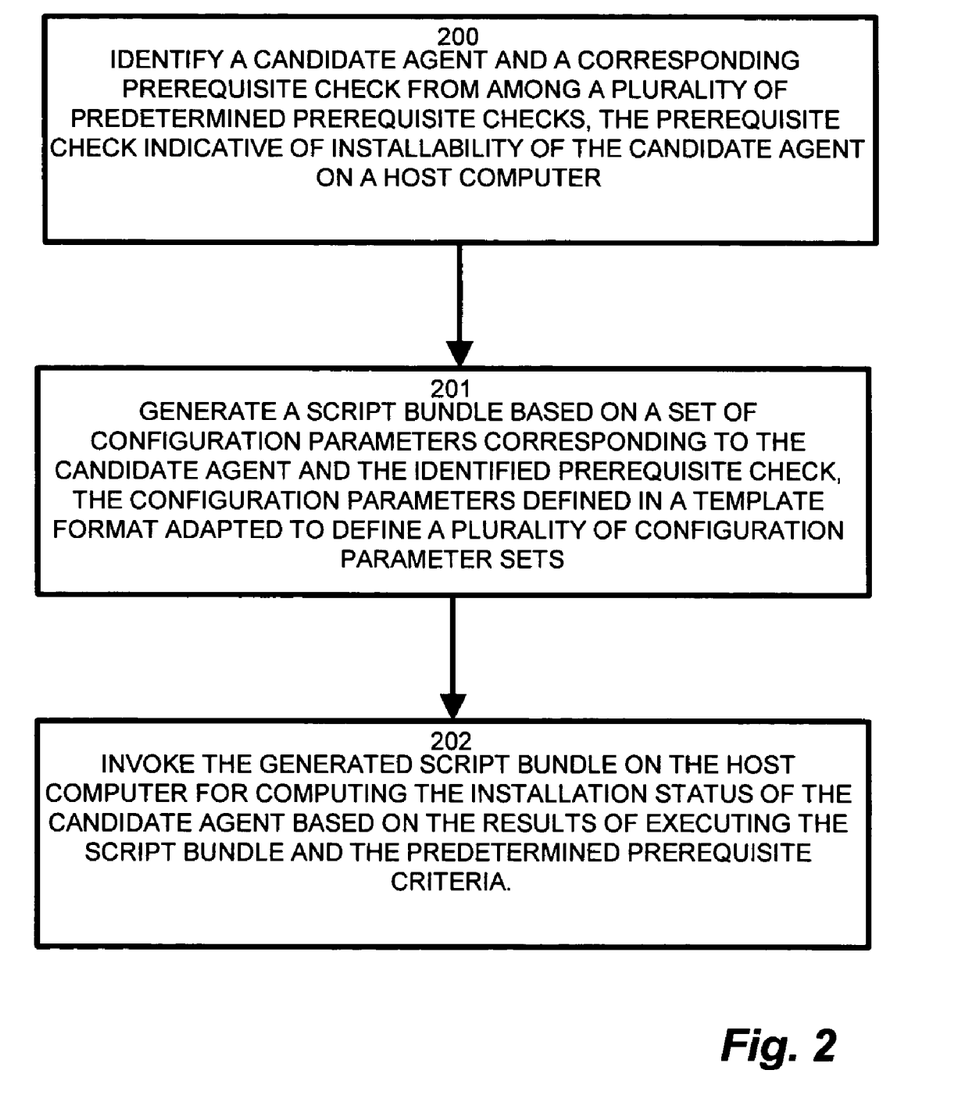
FIG. 2 is a flowchart of script bundle generation in the environment of FIG. 1 as defined herein.

FIG. 2 is a flowchart of script bundle generation in the environment of FIG. 1 as defined herein. Referring to FIGS. 1 and 2, the method of installing agents 132 on a host computer 130 as defined herein includes identifying a candidate agent 132 and a corresponding prerequisite check from among a plurality of predetermined prerequisite checks 172 (FIG. 5, below), in which the prerequisite check is indicative of installability of the candidate agent 132 on a host computer 130, as depicted at step 200. The user selects one or more agents, via a GUI selection 145 on the console 144 or other suitable mechanism, and the install engine 146 identifies the corresponding prerequisite checks for each agent 132.

The install engine 146 generates a script bundle 190 based on a set of configuration parameters 162 (FIG. 4, below) corresponding to the candidate agent 132, the identified prerequisite check 172, and the prerequisite script 158 in which the configuration parameters 164 are defined in a template format adapted to define a plurality of configuration parameter sets 162, as depicted at step 201. The prerequisite script information 170 includes each of the prerequisite checks 172 for a candidate agent 132, such that cumulative checks (i.e. checks that may depend on or be affected by other prerequisite checks) are tested as part of the same script. One such example of a cumulative check is disk space, discussed further below. The configuration parameters correspond to agent specific variables in a template form, shown in further detail below with respect to FIG. 8.

The install engine 146 invokes the generated script bundle 190 on the host computer 130-1 for computing the installation status of the candidate agents 132-N based on the results of executing the prerequisite script and predetermined prerequisite checks 172 (criteria) defined therein, as shown at step 202. The install engine 146 transmits the script bundle 190 to the host 130-1 for execution. A master agent 132-100 (FIG. 3, below) on the host 130 executes the script 190 and returns the prerequisite result 173 to the install engine 146 for analysis. In a typical installation, the install engine 146 generates many script bundles 170, each corresponding to the agents 132 for installation on a particular host 130, and analyzes the prerequisite results 173 of each. The install engine 146 presents the collective results to a user via the GUI 145, as discussed further in the copending U.S. patent application cited above.

Figure 3:
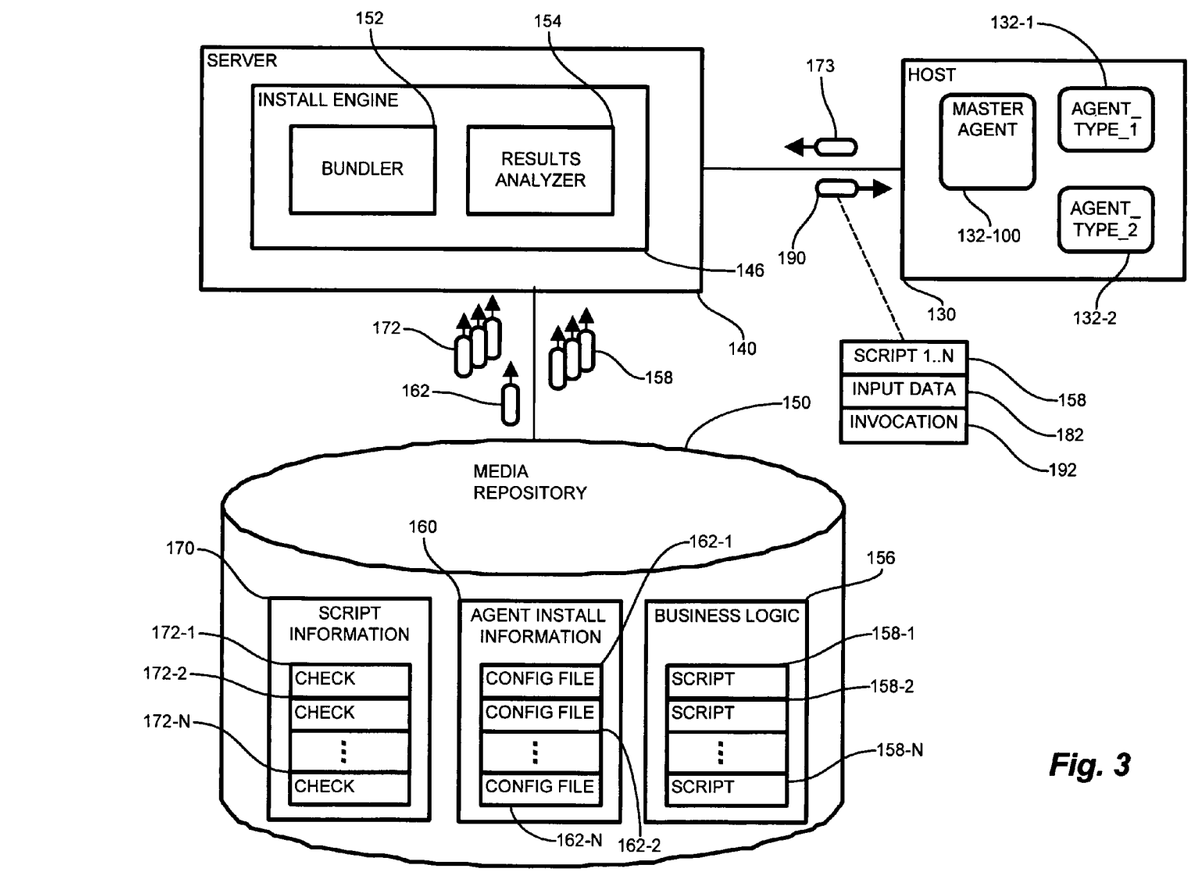
FIG. 3 is a block diagram of the install engine in conjunction with a candidate host for generating a script bundle.

FIG. 3 is a block diagram of the install engine 146 in conjunction with a candidate host 130 for generating a script bundle 190. Referring to FIGS. 1 and 3-5, the install engine 146 defines a the generic framework further including a bundler 152 and a results analyzer 154. The media repository 150 is responsive to the install engine 146 and includes agent install information 160 and script information 170. The agent install information includes a configuration file 162-1 . . . 162-N (162 generally) for each agent 132 type and supported OS. The script information 170 includes a prerequisite check 172-1 . . . 172-N (172 generally) for each prerequisite check 172 performable on a host 132. The install engine 146 is in communication with a master agent 132-100 responsible for managing the installation and startup of the other agents 132-N.

In operation, the bundler 152 receives the configuration file 162 corresponding to a particular candidate agent 132 for installation. The configuration file 162 is generally specific to an agent type and an operating system for the candidate agent 132 for installation. The configuration file 162 includes configuration parameters 164, discussed further below, including one or more check labels indicative of the prerequisite checks 172 to be performed on the host 132. The configuration file 162 also includes other configuration parameters 164 which may be employed by a prerequisite check 172, such as image size (i.e. disk space) and particular product dependencies.

The bundler 152 employs the check label 174 (FIG. 5) from the configuration file 162 to index the corresponding prerequisite check 172 in the media repository 150. In the exemplary configuration, the check label is a character string, discussed further below, which the bundler matches in the script information file 170. The bundler 152 employs the generic framework to apply the indexed (retrieved) prerequisite checks 172, the corresponding prerequisite scripts 158, and applies any additional configuration parameters 164 as input data 182 (i.e. image size for disk space required) to build an aggregate script bundle 190 inclusive of each of the prerequisite scripts 158 applicable to the candidate agent 132. The master agent 132-100 receives the script bundle 190, executes the scripts 158 using an invocation command 192 from the bundle, and returns the results 173 to the results analyzer 154 to assess the status of the prerequisite checks, i.e. to determine if the host 130 has the proper prerequisites to allow installation of the agent 132. The results 173 may also indicate a warning, meaning that the agent may be operational, but at a reduced speed or efficiency, rather than an outright positive or negative result.

Figure 4:
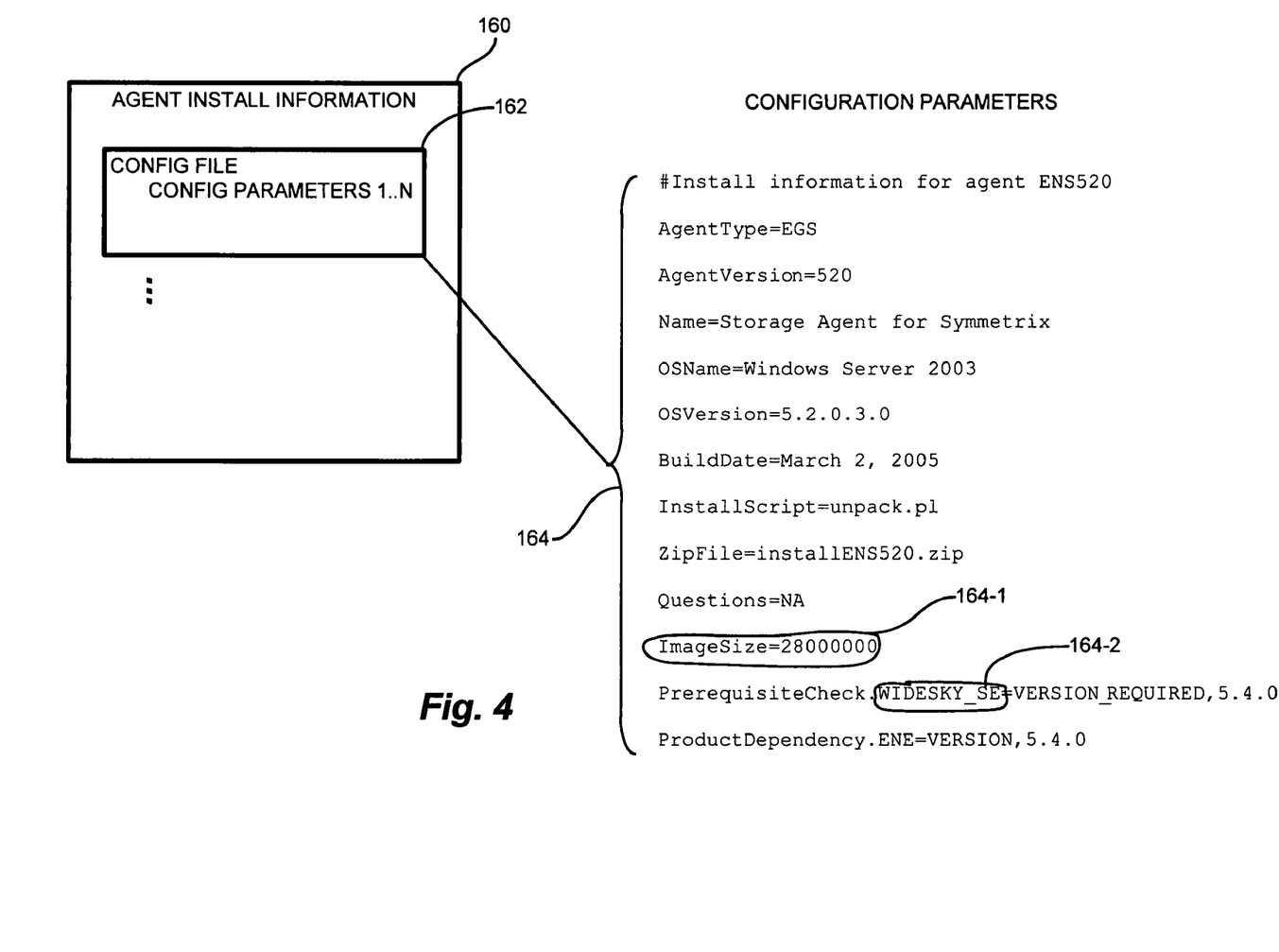
FIG. 4 is an example of the configuration file of FIG. 3.

FIG. 4 is an example of the configuration file 162 of FIG. 3. Referring to FIGS. 3 and 4, the installation information 160 includes a plurality of configuration files 162 (a single exemplary file shown) each including a plurality of configuration parameters 164. Generally, a configuration file 162 exists for each agent type and for each operating system under which the agent 132 executes. The configuration parameters 164, therefore, itemize particular variables appropriate to that agent 132. For example, the image size configuration parameter 164-1 indicates the size of the executable image, and therefore the disk space required. The image size is therefore a cumulative parameter because the script bundle 190 should accommodate the aggregate disk space needs of all agents 132 to be installed, as indicated above. The prerequisite check configuration parameter 164-2 indicates the check label 174 of the prerequisite check in the script information file 170, and is repeated for each check to be performed. Therefore, multiple prerequisite checks are performed by including additional configuration parameters 164-2 referencing the additional scripts 158 for invocation. Accordingly, the bundler 152 retrieves the corresponding prerequisite check 172 matching the check label 174 from the script information 170 for each prerequisite check configuration parameter 164-2. For each prerequisite check 172, the bundler 152 receives the corresponding prerequisite script 158 for inclusion in the script bundle 190.

Figure 5:
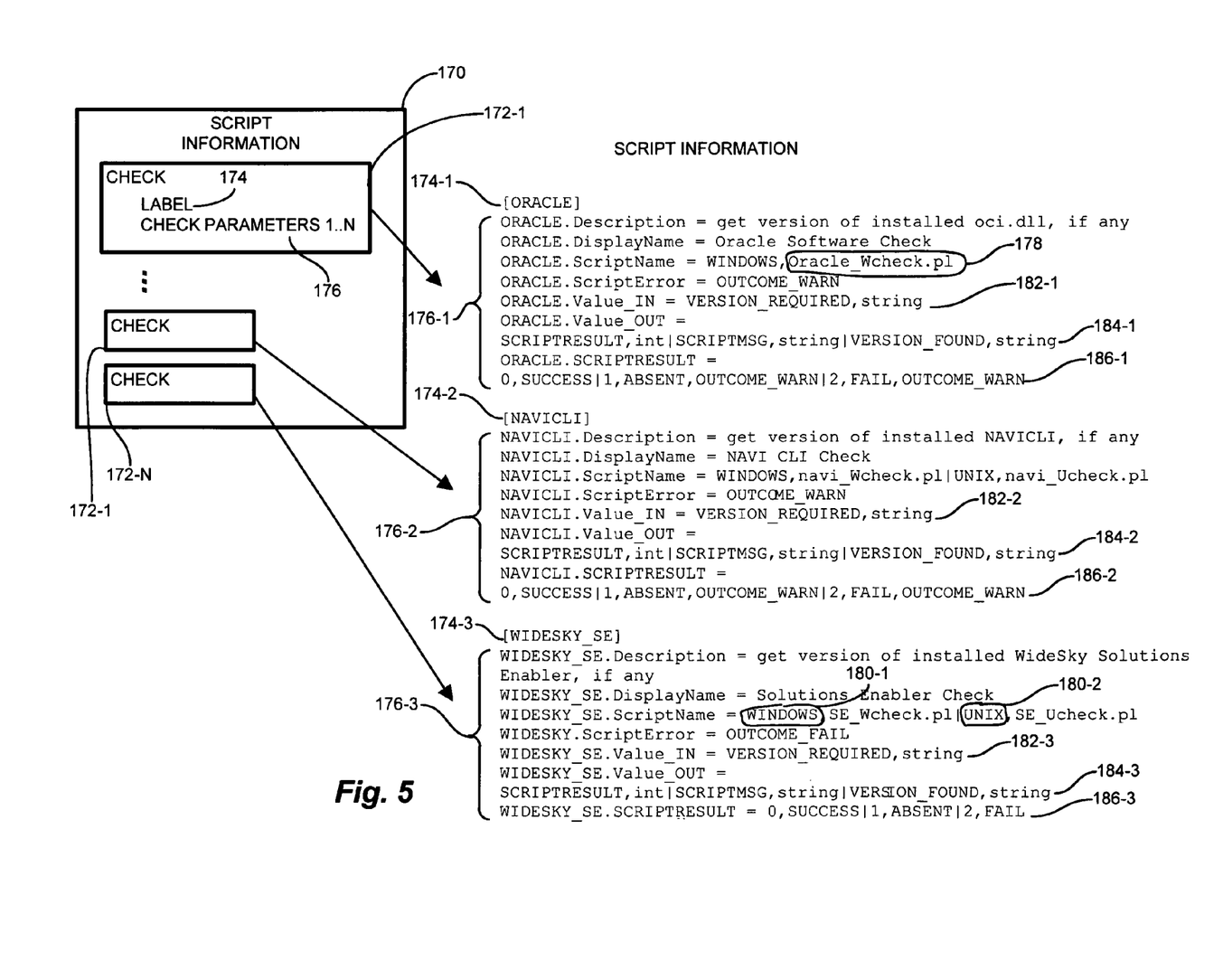
FIG. 5 is an example of the script information file of FIG. 3.

FIG. 5 is an example of the script information file of FIG. 3. Referring to FIGS. 3 and 5, in the exemplary configuration, the script information stored in the script information file 170 for maintaining each of the prerequisite checks 170-1 . . . 170-N in a common repository. Each prerequisite check 170 is referenced by a check label 174. For example, the configuration parameter 164-2 (WIDESKY_SE) from FIG. 4 refers to the check label 174-3. Further, the check parameters 176 include the supporting information which enables the bundler 152 to generate the script bundle 190, along with the configuration parameters specific to each installed agent 132. The check parameters 176 include a file name of a script 178 corresponding to a developer written executable or procedure, which contains the actual instructions for performing the check. The check parameters 176 allow selective parameters based on operating systems, for example, such as script name options 180-1,180-2. An input value 182 allows input value passing to the prerequisite check script 190, and output values 184 are the expected values operable to be matched with results 173 returned from the host 132. The results parameter 186-1 . . . 186-3 (186 generally) allows interpretation of the severity of the result 173, such as pass, warning, or failure.

As indicated above, since there may be multiple scripts 158 included in a script bundle 190, the results analyzer 154 expects multiple sets of result parameters 186. Accordingly, the results analyzer maps the results of each individual script to the severity ranking in the results 186. For each of the scripts 158 executed for a particular agent, if any triggers a fatal result, then prerequisite result is a failure. However, individual prerequisites may fail, for example, having an individual script result of warning, such as 186-1 and 186-2. Such a warning result will not fail the prerequisite check for the agent, as long as none of the other scripts 158 failed with a fatal outcome, such as 186-3.

Figure 6:
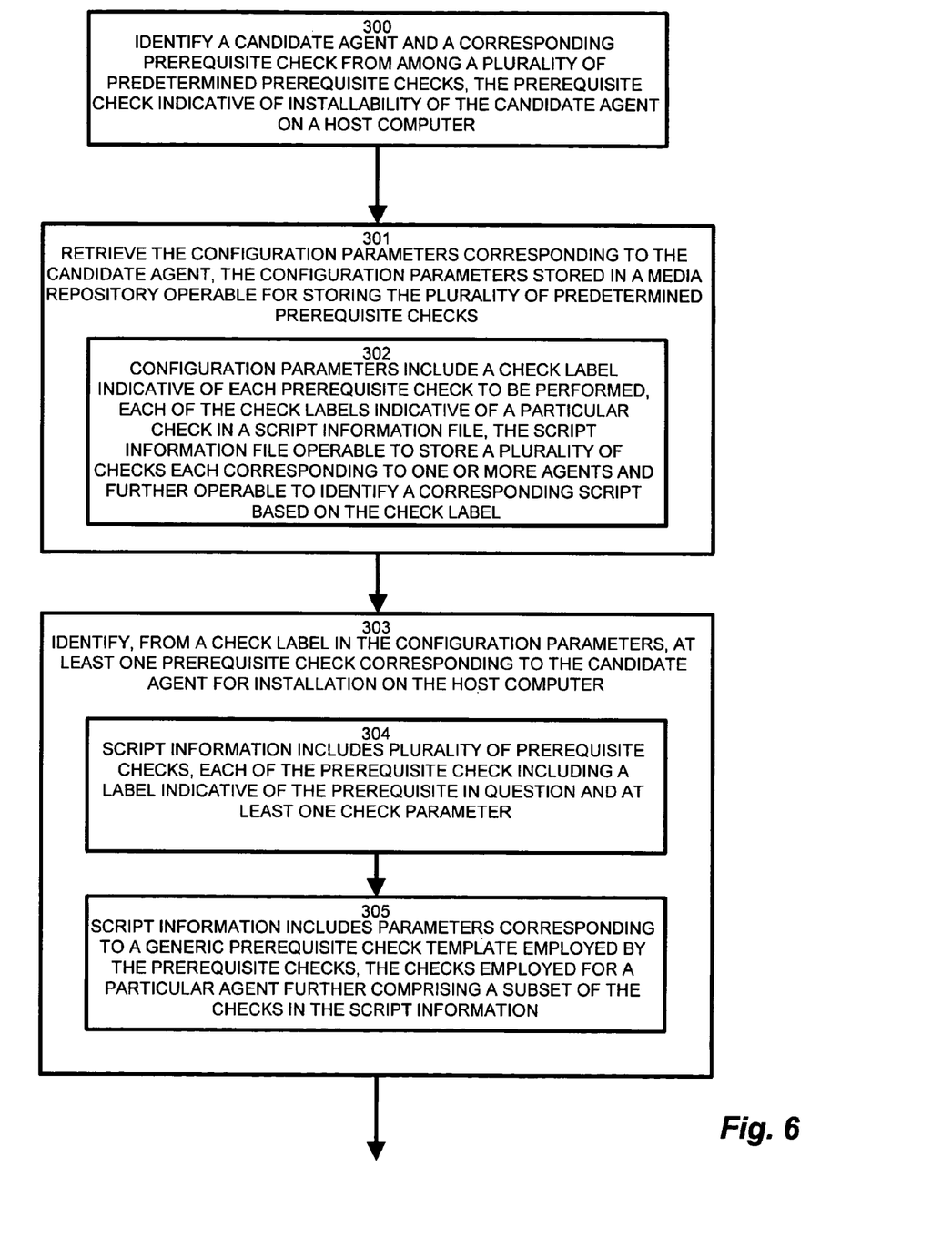
FIGS. 6-8 are a flowchart of script bundle generation in the install engine of FIG. 3.
Figure 7:
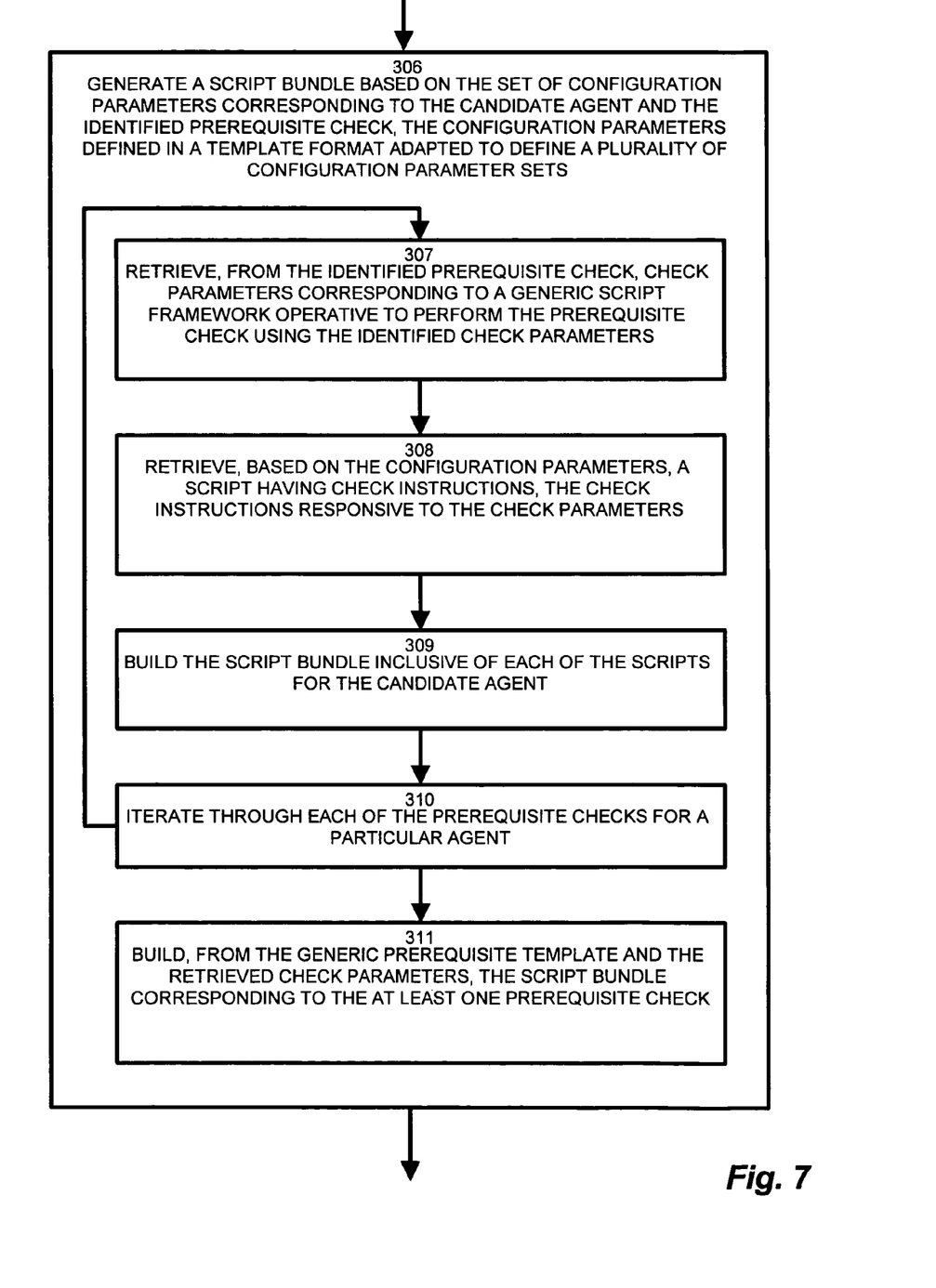
Figure 8:
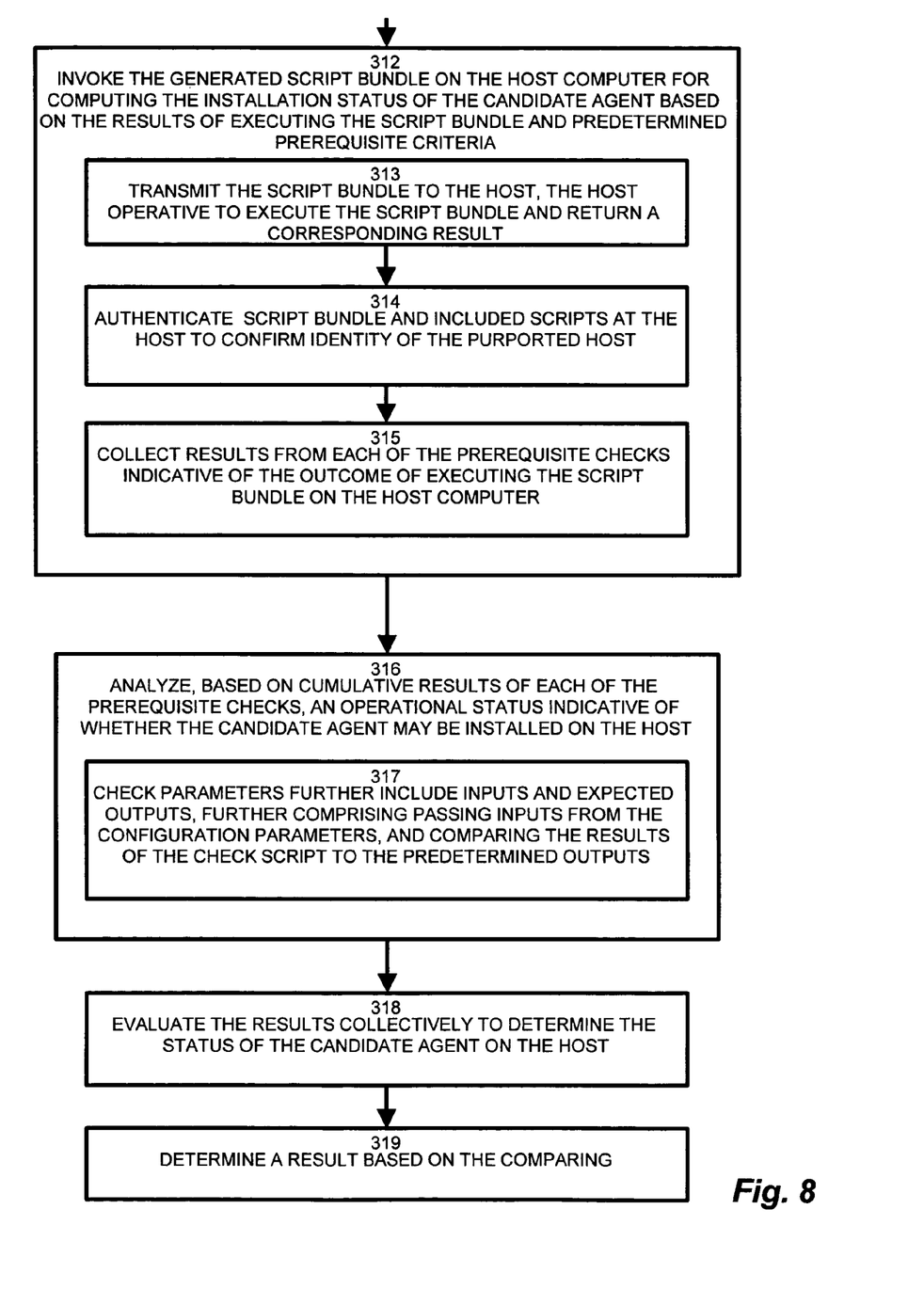

FIGS. 6-8 are a flowchart of script bundle generation in the install engine of FIG. 3. Referring to FIGS. 3-8, in a particular exemplary configuration, the method of installing agents 132 on each of a set of host computers 130, such as in a storage area network configuration, includes identifying a candidate agent 132 and a corresponding prerequisite check 172 from among a plurality of predetermined prerequisite checks 170, in which the prerequisite check 172 is indicative of installability of the candidate agent 132 on a host computer 130, as depicted at step 300. The install engine 146 retrieves the configuration parameters 164 from a configuration file 162 corresponding to the candidate agent 132, in which the configuration parameters 164 are stored in a media repository 150 operable for storing the installation information 160 and predetermined prerequisite checks 172 (script information 170), as disclosed at step 301. The candidate agents 132 are provided based on user direction from any suitable source, such as the console 144.

The configuration parameters 162 include the check label 164-2 indicative of each prerequisite check 172 to be performed, in which each of the check labels 164-2 is indicative of a particular check 172 in the script information 170 file, as shown at step 302. The script information file 170 stores a plurality of checks 172 each corresponding to a particular script 158, indexed by the check label 174 and further operable to generate a corresponding script bundle 190 based on the check labels 174 referenced from the configuration parameters 164 for a particular agent 132.

Therefore, the install engine 146 identifies, from the check label 164-2 in the configuration parameters 162, at least one prerequisite check 172 corresponding to the candidate agent 132 for installation on the host computer 130, as depicted at step 303. The script information 174 includes a plurality of prerequisite checks 172 in the script information file 170, in which each of the prerequisite checks 172 includes the label 174 indicative of the prerequisite check 172 in question and at least one check parameter 176, as shown at step 304. The script information 170 includes the parameters 176 corresponding to the script 158 employed by the prerequisite checks 172, as shown at step 305. The checks 172 employed for a particular agent 132 include a subset of the checks 172 in the script information 170, in which the check parameters 176 selectively include attributes corresponding to different OSs, and the prerequisite check 172 lookup in the script information 170 is performed based on the configuration parameter label 164-1, such that the checks172 are not necessarily based on a particular agent and OS specific dependency. Therefore, the script information 170 labels each prerequisite check 172 and corresponding check parameters 176, and the configuration parameters 162 for each agent 132 identify the prerequisite checks and corresponding scripts 158 for that agent 132 by the labels 174.

The install engine 146 generates the script bundle 190 based on the set of configuration parameters 164 corresponding to the candidate agent 132 and the identified prerequisite check 172, in which the configuration parameters 164 are defined in a template format adapted to define a plurality of configuration parameter sets 164 for each of the checks potentially called for on behalf of the agents 132, as shown at step 306. Using the check label configuration parameter 164-2, the install engine 146 retrieves, from the identified prerequisite check 172, the check parameters 176 corresponding to the generic prerequisite script framework operative to perform the prerequisite check 172 using the identified check parameters 176, as shown at step 307. Accordingly, the install engine 146 retrieves, based on the configuration parameters164, the generic template 156 operative as a script bundle having check instructions, the check instructions responsive to the check parameters 176, as shown at step 308.

The install engine 146 builds the script bundle 190 using the individual check parameters 176 for each check 172 called for by the configuration parameters 164, and the generic framework 156, to generate the script bundle 190 by populating the generic framework 156 with the check parameters 176. Thus, the install engine 146 builds the script bundle 190 inclusive of each of the scripts 158 for the candidate agent 132, as depicted at step 309, by iterating through each of the prerequisite checks 172 for a particular agent 132, as shown at step 310. Control reverts to step 307 to build the additional checks 172 for a particular agent 132 into the generic framework, as called for by the configuration parameters 164-2. Following completion of each check 172 called for on behalf of a particular agent 132, the install engine 146 builds, from the generic prerequisite script framework and the retrieved check parameters 176, the script bundle 190 corresponding to the prerequisite checks 172, and corresponding scripts 158, called for by a particular candidate agent 132, as depicted at step 311.

The install engine 146 invokes the generated script bundle 190 on the host computer 130 for computing the installation status of the candidate agent 132 based on the results of executing the script bundle 190 and predetermined prerequisite criteria, as depicted at step 312. Invoking the script 190 includes transmitting the script bundle 190 to the host 130, in which the host 130 is operative to execute the script bundle 190 and return a corresponding result 173 for comparison with the expected result 184 (i.e. the predetermined prerequisite criteria), as disclosed at step 313. In the exemplary configurations, a master agent 132-100 operates on each host 130 for executing the script bundle 190, discussed further in the copending application cited above. In particular configurations, the install engine 146 employs encryption and/or authentication authenticating the check scripts at the host to confirm identity of the purported host, particularly in a remote or distributed context, as shown at step 314. The host 130 receives and executes the script bundle 190, and generates results 173 of each of the included scripts 158. The results analyzer 154 collects the results 173 from each of the prerequisite checks 172 indicative of the outcome of executing the script bundles 190 on the host computer 132, as depicted at step 315. As indicated above, the check parameters 176 include expected results 184-1 . . . 184-3 (184 generally) for comparison with the check results 173.

Further, the check results 173 may encompass cumulative or static prerequisites. Multiple agents 132 may be installed on a particular host 130. In such a scenario, cumulative checks 172 aggregate the effect of the installation of multiple agents 132. One example of a cumulative prerequisite is disk space, which is summed for each candidate agent 132 for installation to determine if all candidate agents 132 may be installed. An example of a static prerequisites is a supporting host or application which must be present for the candidate agent 132 to execute. The presence of a supporting application (i.e. a software product dependency) is a static condition which is applicable to all agents, but available disk space accrues with each successive agent, and needs to be able to support each candidate agent 132 collectively.

The results analyzer 154 analyzes, based on the cumulative script results 173 of each of the prerequisite scripts 158 included in the script bundle 190, in which the operational status is indicative of whether each of the candidate agents 132 may be installed on the host 130, as shown at step 316. The check parameters 176 further include inputs 182 and expected outputs 184-1 . . . 184-3 (184, generally) and invoking the master agent 132-100 involves passing inputs 182-1 . . . 182-3 (182 generally) from the check parameters 176 passed as script input data 182 in the script bundle 190, as shown at step 317. Analysis of the results 173 therefore includes comparing the script results 173 of the check script to the predetermined (expected) outputs 184. Based on the comparison of the expected outputs 184 to the computed results 173, the results analyzer 154 evaluates the results 173 collectively to determine the status of each of the candidate agents 132 on the host 130, as shown at step 318. The check parameters 176 also include a result severity 186-1 . . . 186-3 (186, generally) to determine a result 173 based on the comparing, as show at step 319. Certain expected output values 184 may be indicative of a warning level, such as reduced or lowered performance or throughput, absent a need to restrict installation altogether. Accordingly, the determined result may be provided to a user indicative of failure, warning, or successful results from the attempted install.

Those skilled in the art should readily appreciate that the programs and methods for performing agent installation and prerequisite checking as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for performing agent installation and prerequisite checking has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method of installing an agent on a host computer comprising:

identifying a candidate agent and a corresponding prerequisite check from among a plurality of predetermined prerequisite checks, the prerequisite check indicative of installability of the candidate agent on a host computer, identifying the candidate agent further comprising:

retrieving the configuration parameters corresponding to the candidate agent, the configuration parameters stored in a media repository operable for storing the plurality of predetermined prerequisite checks; and         identifying, from a check label in the configuration parameters, at least one prerequisite script corresponding to the candidate agent for installation on the host computer;

wherein the check label identifies the prerequisite check to be performed, each of the check labels indicative of a particular check in a script information file, the script information file storing a plurality of checks, each of which corresponds to a particular agent and identifies a corresponding prerequisite script based on the check label;

generating a script bundle based on a set of configuration parameters corresponding to the candidate agent and the identified prerequisite check, the configuration parameters defined in a template format adapted to define a plurality of configuration parameter sets; and invoking the generated script bundle on the host computer for computing the installation status of the candidate agent based on the results of executing the prerequisite check and predetermined prerequisite criteria.

2. The method of claim 1 wherein generating the script bundle further comprises:
retrieving, from the identified prerequisite check, check parameters corresponding to a generic prerequisite template operative to perform the prerequisite check using the identified check parameters; and
building, from the generic prerequisite template and the retrieved check parameters, a script bundle corresponding to the at least one prerequisite check.

3. The method of claim 2 wherein the check parameters include inputs and expected outputs, wherein analyzing further comprises:
passing inputs to the host from the check parameters;
comparing the results of the check script to the predetermined outputs; and
determining a result based on the comparing.

4. The method of claim 1 wherein invoking the script bundle further comprises:
collecting results from each of the prerequisite checks indicative of the outcome of executing the script bundle on the host computer; and
analyzing, based on cumulative results of each of the prerequisite checks, an operational status indicative of whether the candidate agent may be installed on the host.

5. The method of claim 1 wherein the script information includes a plurality of prerequisite checks, each of the prerequisite checks having a label indicative of the prerequisite in question and at least one check parameter.

6. The method of claim 1 where generating the script bundle further comprises retrieving, based on the configuration parameters, a prerequisite script having check instructions, the check instructions responsive to the configuration parameters for generating the script bundle.

7. The method of claim 6 wherein invoking further comprises transmitting the script bundle to the host, the host operative to execute the script bundle and return a corresponding result.

8. The method of claim 7 wherein invoking further comprise authenticating the check scripts at host to confirm identity of the purported host.

9. The method of claim 6 wherein the script information includes check parameters corresponding to a generic prerequisite check template employed by the prerequisite checks, the checks employed for a particular agent further comprising a subset of the checks in the script information, wherein:
the check parameters selectively include attributes corresponding to different operating systems; and
the prerequisite check lookup in the script information is performed based on the configuration parameters, wherein the scripts are not dependent on a particular agent and Operating System (OS) specific dependency.

10. The method of claim 1 further comprising
iterating through each of the prerequisite checks for a particular agent;
building the script bundle inclusive of each of the checks for the candidate agent; and
evaluating the results collectively to determine the status of the candidate agent on the host.

11. The method of claim 1 wherein the prerequisite checks are configured to determine if the individual host has proper prerequisites to allow installation of the target agent independently of other hosts in the Storage Area Network (SAN).

12. The method of claim 1 wherein the configuration parameters include a check label indicative of check parameters, the check parameters defining a script, and receivable by a script template for performing a host specific prerequisite check, the check parameters of an individual check label include Operating System (OS) selective parameters configured for use with different operating systems.

13. A method for performing prerequisite checks for software deployment on a storage area network host computer comprising:
receiving installation information from a configuration file indicative of a particular agent type and at least one prerequisite check deterministic of installability of the agent on a host computer, the installation information identifying the candidate agent by:
retrieving configuration parameters corresponding to the candidate agent, the configuration parameters stored in a media repository operable for storing the plurality of predetermined prerequisite checks; and
identifying, from a check label in the configuration parameters, at least one prerequisite script corresponding to the candidate agent for installation on the host computer;
identifying, via the check label in the installation information, the prerequisite check in a script information file, the prerequisite check having check parameters;
wherein the check label identifies a prerequisite check to be performed, each of the check labels indicative of a particular check in a script information file, the script information file storing a plurality of checks, each of which corresponds to a particular agent and identifies a corresponding prerequisite script based on the check label;
generating, from configuration parameters in the configuration file and the check parameters, a script bundle operable to perform the prerequisite check for the agent type on a host computer;
transmitting the generated script bundle to the host computer for execution on the host computer;
receiving a script result from the host computer indicative of the ability to install the agent on the host computer; and
analyzing the script result and selectively performing the installation of the particular agent on the host computer based on the analysis.

14. The method of claim 13 wherein analyzing occurs in a cumulative manner with others of a plurality of script results from the host computer, and computing an aggregate result indicative of whether to proceed with the installation.

15. A storage area network management server device having a processor responsive to a set of instructions for installing an agent on a host computer comprising:
a processor responsive to a set of instructions for installing an agent on a host computer, the set of instructions further comprising:
an install engine operable to identify a candidate agent and a corresponding prerequisite check from among a plurality of predetermined prerequisite checks, the prerequisite check indicative of installability of the candidate agent on a host computer the install engine including a results analyzer further configured to:
retrieve the configuration parameters corresponding to the candidate agent, the configuration parameters stored in a media repository operable for storing the plurality of predetermined prerequisite checks; and
identify, from a check label in the configuration parameters, at least one prerequisite check corresponding to the candidate agent for installation on the host computer;

wherein the check label identifies the at least one prerequisite check to be performed, each of the check labels indicative of a particular check in a script information file, the script information file storing a plurality of checks, each of which corresponds to a particular agent and identifies a corresponding prerequisite script based on the check label;

a set of configuration parameters, the install engine including a bundler operable to generate a script bundle based on the set of configuration parameters corresponding to the candidate agent and the identified prerequisite check, the configuration parameters defined in a template format adapted to define a plurality of configuration parameter sets; and a network interface, responsive to the install engine, operable to invoke the generated script bundle on the host computer for computing the installation status of the candidate agent based on the results of executing the script bundle and predetermined prerequisite criteria.

16. The storage area network management device of claim 15 wherein the bundler is further operable to:

retrieve, from the identified prerequisite check, check parameters corresponding to a generic prerequisite template operative to provide input to the prerequisite check using the identified check parameters; and build, from the generic prerequisite template and the retrieved check parameters, the script bundle corresponding to the at least one prerequisite check.

17. The storage area network management device of claim 15 wherein the install engine is further operable to:

invoke the script bundle via the network interface;

collect results from each of the prerequisite checks indicative of the outcome of executing the script bundle on the host computer; and analyze, based on cumulative results of each of the prerequisite checks, an operational status indicative of whether the candidate agent may be installed on the host.

18. The storage area network management device of claim 17 wherein the check parameters include inputs and expected outputs, wherein the install engine is further operable to:

pass the inputs to the host from the check parameters compare the results of the check script to the predetermined outputs; and determine a result based on the comparing.

19. The storage area network management device of claim 15 wherein the script information includes a plurality of prerequisite checks, each of the prerequisite checks including a label indicative of the prerequisite in question and at least one check parameter.

20. The storage area network management device of claim 15 where the install engine is further operable to define, based on the configuration parameters, a script bundle operative to include a prerequisite script having check instructions, the check instructions responsive to the check parameters for input data to the script bundle.

21. The storage area network management device of claim 20 wherein the network interface is further operable to transmit the script bundle to the host, the host operative to execute the script bundle and return a corresponding result.

22. The storage area network management device of claim 20 wherein the script information includes check parameters corresponding to the generic prerequisite check template employed by the prerequisite checks, the checks employed for a particular agent further comprising a subset of the checks in the script information, wherein the check parameters selectively include attributes corresponding to different operating systems; and the install engine is operable to perform the prerequisite check lookup in the script information based on the configuration parameters, wherein the scripts are not dependent on a particular agent and operating system specific dependency.

23. A computer program product having a non-transitive computer readable storage medium operable to store computer program logic embodied in computer program code encoded thereon for performing prerequisite checks for deployment on a host computer comprising:

computer program code for retrieving configuration parameters corresponding to a candidate agent, the candidate agent operable for installation non a host computer;

computer program code for identifying, from the configuration parameters, at least one prerequisite check corresponding to the candidate agent for installation on the host computer;

computer program code for retrieving, from the identified prerequisite checks, prerequisite parameters corresponding to a generic prerequisite template operative to identify the prerequisite check and a corresponding script using the identified prerequisite parameters;

computer program code encoded for building, from the generic prerequisite template and the identified configuration parameters, a script bundle corresponding to the at least one prerequisite check;

computer program code for invoking the script bundle by applying the configuration parameters and the check parameters, the script bundle operable for performing a plurality of checks identified by the labels in the script information file and for plurality of agent types specified by the configuration files;

computer program code for collecting results from each of the prerequisite checks indicative of the outcome of the respective prerequisite check the host computer; and computer program code for analyzing, based on cumulative results of each of the prerequisite checks, an operational status indicative of whether the candidate agent may be installed on the host;

wherein the labels identify the checks to be performed, each of the labels indicative of a particular check, the script information file storing a plurality of checks, each of which corresponds to a particular agent and identifies a corresponding prerequisite script based on the label.

24. An install engine embodied as a set of instructions responsive to a processor for installing an agent on a host computer comprising:

processor means for executing the set of instructions;

means for retrieving configuration parameters corresponding to a candidate agent, the configuration parameters stored in a media repository operable for storing a plurality of predetermined prerequisite checks;

means for receiving, based on the configuration parameters, installation information from a configuration file indicative of a particular agent type and at least one prerequisite check deterministic of installability of the candidate agent on a host computer;

means for identifying, via a check label in the installation information, a prerequisite check in a script information file, the prerequisite check having check parameters, the prerequisite check corresponding to the candidate agent for installation on the host computer;

means for generating, from configuration parameters in the configuration file and the check parameters, a script bundle operable to perform the prerequisite check for the agent type on a host computer;

means for transmitting, via a network interface, the generated script bundle to the host computer for execution on the host computer;

means for receiving, via the network interface, a script result from the host computer indicative of the ability to install the agent on the host computer;

means for analyzing the script result and selectively performing the installation of the particular agent on the host computer based on the analysis, the analyzing occurring in a cumulative manner with others of a plurality of script results form the candidate host, and computing an aggregate result indicative of whether to proceed with the installation; and wherein the check label identifies the prerequisite check to be performed, each of the check labels indicative of a particular check in the script information file, the script information file storing a plurality of checks, each of which corresponds to a particular agent and identifies a corresponding prerequisite script based on the check label.

* * * * *